US010719813B1

(12) United States Patent
Beckmann et al.

(10) Patent No.: US 10,719,813 B1
(45) Date of Patent: Jul. 21, 2020

(54) REMOTE DIAGNOSTIC SYSTEM FOR VEHICLES

(75) Inventors: Robert U. Beckmann, Durham, NC (US); Michael Kirlauski, Durham, NC (US); Andrew Woodard, Durham, NC (US)

(73) Assignee: Bluelink Diagnostic Solutions, Inc., Durham, NC (US)

( * ) Notice: Subject to any disclaimer, the term of this patent is extended or adjusted under 35 U.S.C. 154(b) by 392 days.

(21) Appl. No.: 13/245,641

(22) Filed: Sep. 26, 2011

Related U.S. Application Data

(60) Provisional application No. 61/387,823, filed on Sep. 29, 2010.

(51) Int. Cl.
   *G06Q 40/00* (2012.01)
   *G06Q 10/00* (2012.01)

(52) U.S. Cl.
   CPC .................................. *G06Q 10/20* (2013.01)

(58) Field of Classification Search
   CPC ......... G07C 5/008; G06Q 10/06; G06Q 10/20
   USPC .......................................................... 705/40
   See application file for complete search history.

(56) References Cited

U.S. PATENT DOCUMENTS

| | | | |
|---|---|---|---|
| 6,154,658 A * | 11/2000 | Caci | .............................. 455/466 |
| 6,728,603 B2 | 4/2004 | Pruzan et al. | |
| 6,879,894 B1 | 4/2005 | Lightner et al. | |
| 6,956,501 B2 | 10/2005 | Kitson | |
| 7,092,803 B2 | 8/2006 | Kapolka et al. | |
| 7,373,226 B1 | 5/2008 | Cancilla et al. | |
| 7,502,672 B1 | 3/2009 | Kolls | |
| 7,519,458 B2 | 4/2009 | Buckley | |
| 7,532,962 B1 | 5/2009 | Lowrey et al. | |
| 7,584,030 B1 | 9/2009 | Graham | |
| 7,840,812 B1 | 11/2010 | Levenberg | |
| 7,928,837 B2 | 4/2011 | Drew et al. | |
| 8,190,322 B2 | 5/2012 | Lin et al. | |
| 8,259,936 B2 | 9/2012 | Mahalingaiah | |

(Continued)

FOREIGN PATENT DOCUMENTS

WO    WO-2004092857 A2 * 10/2004    ............. G06Q 10/08

OTHER PUBLICATIONS

Ellery: "Systems design and control of a freeflying space robotic manipulator system (ATLAS) for in-orbit satellite servicing operations", Cranfield University (United Kingdom), ProQuest Dissertations Publishing (Year: 1996).*

(Continued)

*Primary Examiner* — Edward J Baird
(74) *Attorney, Agent, or Firm* — Gardner, Linn, Burkhart & Ondersma LLP

(57) ABSTRACT

Diagnosing vehicle anomalies efficiently is dependent upon the expertise of the repair technician, but also the availability of resources. As vehicles have become increasingly computerized, repair technicians have become increasingly specialized in a smaller number of vehicle models. Dealerships and large repair shops have an advantage in that they can more easily afford to obtain specialized electronic tools. However, repair technicians in smaller repair shops often are more skilled, but are unable to afford access to advanced electronic tools and software. A system for using remotely located resources to improve the diagnosis and resolution of vehicle anomalies, including the use of expert technicians and vehicle-specific databases, is disclosed.

4 Claims, 1 Drawing Sheet

(56) References Cited

U.S. PATENT DOCUMENTS

| | | | |
|---|---|---|---|
| 8,306,687 | B2 | 11/2012 | Chen |
| 8,339,254 | B2 | 12/2012 | Drew et al. |
| 8,352,577 | B2 | 1/2013 | Martone |
| 8,688,313 | B2 | 4/2014 | Margol et al. |
| 8,909,416 | B2 | 12/2014 | Chen et al. |
| 10,181,225 | B2 | 1/2019 | Liebl et al. |
| 2001/0056544 | A1* | 12/2001 | Walker .................. B60R 25/02 726/2 |
| 2003/0001720 | A1* | 1/2003 | Wade et al. .................... 340/3.5 |
| 2003/0020759 | A1 | 1/2003 | Cancilla et al. |
| 2004/0044454 | A1 | 3/2004 | Ross |
| 2004/0167689 | A1* | 8/2004 | Bromley et al. .................. 701/29 |
| 2005/0021294 | A1* | 1/2005 | Trsar et al. .................... 702/183 |
| 2005/0038581 | A1 | 2/2005 | Kapolka et al. |
| 2005/0060070 | A1* | 3/2005 | Kapolka et al. ................ 701/29 |
| 2005/0182537 | A1* | 8/2005 | Tefft et al. ...................... 701/29 |
| 2005/0240555 | A1 | 10/2005 | Wilde et al. |
| 2005/0251304 | A1 | 11/2005 | Cancellara et al. |
| 2006/0052921 | A1* | 3/2006 | Bodin et al. .................... 701/33 |
| 2006/0106508 | A1 | 5/2006 | Liebl et al. |
| 2006/0211446 | A1 | 9/2006 | Wittmann et al. |
| 2007/0005201 | A1* | 1/2007 | Chenn ............................. 701/29 |
| 2007/0043488 | A1 | 2/2007 | Avery et al. |
| 2007/0050105 | A1 | 3/2007 | Chinnadurai et al. |
| 2007/0055420 | A1* | 3/2007 | Krzystofczyk et al. ........ 701/29 |
| 2007/0073460 | A1* | 3/2007 | Bertosa et al. ................. 701/29 |
| 2007/0185624 | A1 | 8/2007 | Duddles et al. |
| 2007/0233340 | A1* | 10/2007 | Raichle et al. ................. 701/29 |
| 2008/0177438 | A1 | 7/2008 | Chen et al. |
| 2008/0269975 | A1* | 10/2008 | Bertosa .................. G07C 5/008 701/31.4 |
| 2008/0280602 | A1 | 11/2008 | Ban |
| 2009/0062978 | A1* | 3/2009 | Picard ............................. 701/29 |
| 2009/0118899 | A1* | 5/2009 | Carlson .................. G01C 22/02 701/33.4 |
| 2009/0119657 | A1 | 5/2009 | Link, II |
| 2009/0187976 | A1 | 7/2009 | Perroud et al. |
| 2009/0265055 | A1 | 10/2009 | Gillies |
| 2009/0276115 | A1 | 11/2009 | Chen |
| 2010/0042287 | A1* | 2/2010 | Zhang .................. G06Q 10/06 701/31.4 |
| 2010/0174446 | A1 | 7/2010 | Andreasen et al. |
| 2010/0204878 | A1* | 8/2010 | Drew et al. ..................... 701/33 |
| 2010/0262335 | A1 | 10/2010 | Brozovich |
| 2011/0071709 | A1 | 3/2011 | Damiani et al. |
| 2011/0153150 | A1 | 6/2011 | Drew et al. |
| 2011/0276218 | A1* | 11/2011 | Dwan .................. G07C 5/008 701/29.5 |
| 2011/0313593 | A1 | 12/2011 | Cohen et al. |
| 2012/0046826 | A1 | 2/2012 | Panko |
| 2012/0254345 | A1 | 10/2012 | Montoya |

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

* cited by examiner

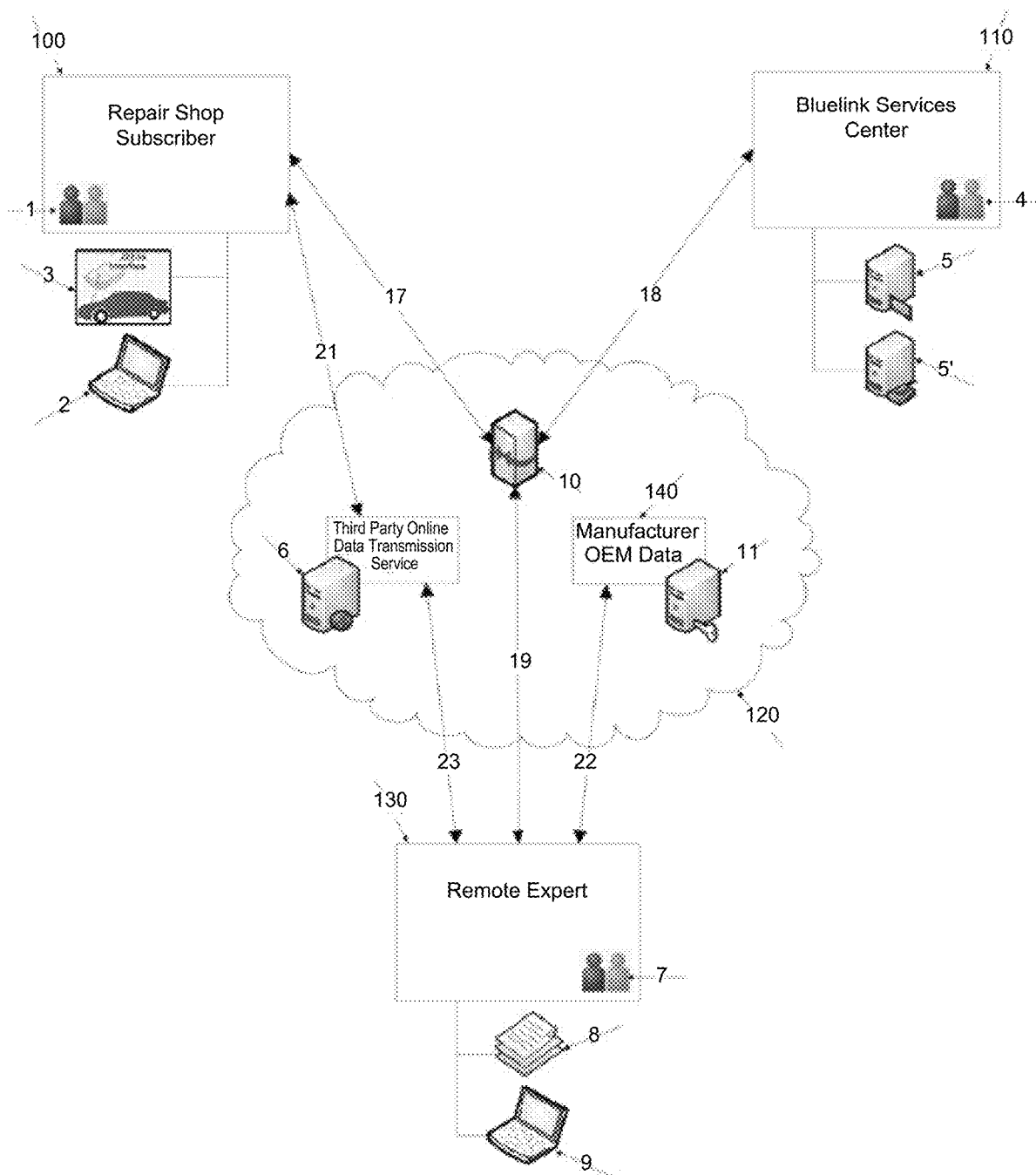

REMOTE DIAGNOSTIC SYSTEM FOR VEHICLES

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates generally to providing diagnostic solutions for analyzing, vehicle anomalies, and remotely modifying certain software stored in vehicle electronic control modules, by using communication networks such as the internet. The improved diagnostic system disclosed solves many of the limitations of traditional diagnostic tools. The use of the diagnostic tools and the system of the present invention results in better and faster diagnosis of vehicle problems, resulting in faster and less expensive vehicle repairs compared to what can be accomplished with diagnostic tools of the prior art.

The use of electronic diagnostic tools is well known in the prior art. As vehicle manufacturers have increasingly incorporated electronic controls into new vehicles, the need for electronic diagnostic tools has increased in lock-step. The cost of such electronic diagnostic tools has increased as the sophistication of vehicle electronic systems has increased. While this cost is not insignificant for any repair shop, the cost is far more significant for independent, repair shops as opposed to a manufacturer's dealer. Certain third party diagnostic and/or programming routines are available for purchase by individual vehicle owners. Such programming routines may be downloaded for use on a single computer, and the typical cost for such routines may be a one-time payment of several hundred dollars. Such programming routines for complete vehicle diagnostics and repair for all vehicles offered by a vehicle manufacturer may cost tell thousand dollars or more, and typically require the purchase of an annual subscription service that can cost thousands of dollars a year. While a vehicle dealer may only need to obtain the diagnostic tools for the vehicles manufactured by its affiliated manufacturers, independent repair shops require multiple diagnostic tools if they want to specialize in repairing more than one manufacturer's vehicles. It is an objective of the present invention to provide a diagnostic tool system that works with any manufacturer's vehicles.

Even when the availability and cost of diagnostic tools is not an issue, the availability of information related to diagnostics remains an issue. Due to concerns about legal and financial liability, most vehicle manufacturers are reluctant to share information about troubleshooting vehicle problems, including routine information related to vehicle diagnostic codes that all vehicles produce and store in response to vehicle anomalies. In response to this problem, there are now many different networks of independent repair shops and mechanics that have been formed to share collective knowledge gained in the field. The sharing of information is often impeded by the reluctance of vehicle manufacturers to allow the mechanics that work for its dealers to share such information. It is therefore another objective of the present invention to facilitate the sharing of relevant information to improve diagnostics while respecting the proprietary concerns of the vehicle manufacturers.

The diagnostic system and tools of the present invention provide benefits for the vehicle manufacturer, the dealer network, independent repair shops, and vehicle owners. For the vehicle manufacturer, the benefit is that the vehicle is fixed correctly in a timely and efficient manner. Programming, coding, and verification related to the repair are properly documented, and there is an audit path back to the diagnostician. For the dealer network, the benefit is that complex repair, programming, and coding procedures can be handled by remote experts in the field. This allows the dealer to minimize the amount of diagnostic equipment and software required in each repair bay. For the independent repair shop, the benefit is that the shop can significantly reduce its financial investment in diagnostic tools and software. The independent shop can also more quickly resolve difficult vehicle diagnostics and programming. The benefit for the vehicle owner is that the owner can seek repairs at a dealer or an independent shop as they so choose without consideration to whether the shop has the necessary tools and access to a field knowledge base. This can result in faster repairs, reduced cost, and a better overall vehicle ownership experience.

DESCRIPTION OF RELATED ART

There exist many types of prior art diagnostic tools. Certain diagnostic tools are proprietary to a given manufacturer, and these tools typically include proprietary software. Many prior art diagnostic tools comprise a dedicated hardware device that includes a standard electrical and physical interface and retain proprietary software in non-volatile or programmable memory. Such software may include the majority of a given manufacturer's repair procedures and other information that can be downloaded from the diagnostic tool to the electronic memory in the vehicle's electronic systems. A typical repair shop needs to own its own copy of each manufacturer's respective diagnostic tool. Such prior art diagnostic tools are connected directly to a vehicle using a physical electrical port. The repair technician can command the diagnostic tool to run stored diagnostic routines in order to retrieve proprietary error or condition codes from the vehicle's electronic systems. The tool can analyze such codes, and then download software patches that correct certain vehicle anomalies. In many cases, the technician may command the diagnostic tool to download updated software to the vehicle regardless of whether the vehicle in question currently exhibits any anomalies. The diagnostic tool is also used to provide detailed instructions to the technician for servicing the vehicle based on the codes that have been read from the vehicle.

However, the increasing complexity of modern vehicles has led to two problems that make the use of proprietary diagnostic tools impractical. First, the sheer quantity of information required to make all possible repairs tends to make older tools rapidly obsolete. As the vehicle manufacturers have increased their reliance on the use of software and programmable electronic modules over hard-coded microcontrollers, there exists now a need to frequently update the software stored in such diagnostic tools. Such updating is now typically performed using a standard personal computer with an internet connection. Second, as the tools become increasingly capable and complex, the technicians require extensive training in order to use these tools properly. If the tools are used improperly or the software is not kept current, the repair shop runs the risk of failing to properly diagnose anomalies or applying incorrect repairs.

A typical modern diagnostic tool of the prior art connects to a vehicle using a standard interface. The standard communications interface used on all vehicles since 2004 for electronic control unit (ECU) pass-thru programming is the SAE J2534 interface. The standard physical interface for vehicles is the On-Board Diagnostic port (OBD-II) developed by the Society of Automotive Engineers. The OBD-II interface also comprises a set of standard diagnostic codes that have been adopted by the Environmental Protection Agency. One example of a physical device that uses such an interface is the Mongoose PassThru vehicle network interface manufactured by Drew Technologies. This interface cable has an OBD-II connector on one end that connects to the diagnostic port on a vehicle and a standard universal serial bus (US B) connector on the other end that connects to any standard computer device such as a personal computer. This type of interface cable allows a repair shop to use a standard personal computer to reprogram ECUs in the field. As the use of such prior art diagnostic tools have proliferated, so has the need for the tool manufacturers and vehicle manufacturers to make sure that the software resident in the diagnostic tools is current and that the tool owner has a valid software subscription. Several tool manufacturers have introduced tools that can be updated on the fly. This update methodology, utilizing special challenge-response patterns, guarantees not only that the repair shop is a valid subscriber with an authorized copy of the software, but also that the vehicle being repaired will receive the proper diagnosis and proper coding. Ultimately though, it is the responsibility of the shop technician to make the proper requests, and much of the intellectual property of such tools is still stored locally on the physical hardware device.

There are certain service providers that have tried to use proprietary repair tools to diagnose vehicles in more than one location. For instance, there are repair service companies that have been able to obtain software licenses from vehicle manufacturers that allow the repair companies to use the software in more than a single location. In one known instance, a repair service company has mounted the proprietary diagnostic tools provided by multiple vehicle manufacturers in a service truck. The company then drives around a broad geographic area, and stops at numerous local repair shops that specialize in repairing vehicles made by those manufacturers. The company can do this because their software license allows them to use the proprietary diagnostic tool in the geographic area. The benefit to the repair service company is that they can provide diagnostic services to a much larger number of customers than they otherwise could if they were reliant on customers to bring their cars to them. Also, since they are only providing the diagnostic services rather than the actual repairs, they can diagnose a far greater number of vehicle anomalies in any given time period. By spreading the capital investment in the diagnostic tools and software license over a greater population, the per-use cost is much lower. The benefit to the local repair shops is that they do not have to purchase the proprietary diagnostic tool and software that would be prohibitively expensive for a small shop. Therefore, it is an objective of the present invention to provide a similar level of diagnostic capability remotely to a much greater geographic area without having to drive around the area providing diagnostic services. It is a further objective of the system of the present invention to provide diagnostic services for vehicles made by all manufacturers. It is a further objective to create a pool of experts that can share their expertise with all subscribing users of the diagnostic tool of the present invention.

SUMMARY OF THE INVENTION

The diagnostic system and tools of the present invention accomplishes the above objectives as described below.

The remote diagnostic system of the present invention uses a standard communications protocol to provide remote diagnostics of vehicle anomalies using a global communications network such as the Internet. Unlike other diagnostic systems that rely on a diagnostic system or tool that runs in a shop and may retrieve some limited information via a communications network, whether a proprietary network or the Internet, the diagnostic system of the present invention is suitably enabled to remotely run any compatible software and connect directly to the vehicle being diagnosed over the Internet. The vehicle responds to the diagnostic system of the present invention in the same manner it would if the diagnostic tool was located in the same repair bay as the vehicle. The diagnostic system of the present invention may utilize any number of standard communications protocols.

In a preferred embodiment, the diagnostic system uses the J2534 programming interface. J2534 is an Environmental Protection Agency mandated programming application programming interface (API) that all vehicle manufacturers have adopted for all vehicles built since 2004. The Society of Automobile Engineers (SAE) adopted the J2534 interface and created a standardization that enables a uniform methodology for repair shops and consumers to communicate with any J2534-compliant vehicle. This means that all J2534-compliant vehicles and all software applications written using the J2534 API will theoretically be able to interconnect and communicate. The current state of the art is that the J2534 interface is currently being used with vehicle repair tools that are located locally (in a repair bay).

The diagnostic system of the present invention is suitably enabled to communicate with a vehicle located in a remote repair bay and provide vehicle diagnostics via a global communications network such as the internet.

Using the aggregated knowledge of one or more expert diagnosticians, a repair technician can repair a vehicle more quickly, saving both the shop and the vehicle owner time and money. It is the knowledge of the expert diagnostician that allows the shop technician to quickly and efficiently diagnose a vehicle anomaly without the need for a repair shop to own its own copy of all hardware and software tools available from all vehicle manufacturers; a financial proposition that is impractical for all but the very largest repair shops. The expert diagnostician charges a premium for access to his knowledge, and as such system of the present invention maintains both the intellectual property of the expert diagnostician as well as the intellectual property of the vehicle and/or diagnostic tool manufacturer. This is accomplished by maintaining the confidentiality of the practices of the diagnostician (he can evaluate a vehicle remotely in the same manner he would if he was physically located in the repair bay), nor the software code and/or data owned by the diagnostic tool manufacturer being used.

Vehicle manufactures are notoriously reluctant to publish service repair information bulletins for a variety of reasons. To do so may reflect poorly on the manufacturer's reputation for quality products. More importantly such disclosure can result in financial or legal liability if it becomes public knowledge that the manufacturer knew or should have known about certain problems. At a minimum, vehicle owners would pressure the manufacturer to pay for vehicle repairs beyond the warranty period if it became known that the problem was a known defect while the vehicle was still under warranty. The vehicle manufacturers also do not wish to reveal specific commands and instructions that their software executes/performs on their proprietary diagnostic tools and in vehicle computers. In addition, the vehicle manufacturers are concerned about security issues related to having their proprietary software loaded on a computer located on a shop floor or repair bay due to hacking, reverse engineering, and physical theft. While vehicle dealers are contractually obligated to the manufacturers they represent, independent repair shops are not. Therefore, independent shops create valuable information related to certain vehicle defects that they are free to share with other shops and/or vehicle owners. Therefore, a group of such repair shops can aggregate such information that can then be exchanged among the group members. It is therefore another objective of the system of the present invention to facilitate, the aggregation and dissemination of such diagnostic and repair history data. However, expert diagnosticians also value their expertise, and will only share such expertise if they can maintain the confidentiality of their proprietary knowledge while still providing a service to an independent repair shop. By using the system of the present invention, a repair shop can obtain expert advice remotely and quickly obtain a precise and accurate solution to correcting a vehicle anomaly while still preserving the proprietary knowledge of an expert diagnostician.

BRIEF DESCRIPTION OF THE DRAWINGS

One or more preferred embodiments of the present invention will now be described in detail with reference to the accompanying drawings, wherein the same elements are referred to with the same reference numerals.

FIG. 1 illustrates block diagram showing the system of the present invention.

DETAILED DESCRIPTION

As a preliminary matter, it will readily be understood by one having ordinary skill in the relevant art (an "Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended to, nor is to be construed to, limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 illustrates a block diagram that illustrates the elements of the system of the present invention and the interconnections of such elements. Block 100 shows the elements of the system that are typically located in one or more repair shops. Block 110 illustrates the elements of the system that are located in one or more remote service centers. Block 120 shows the elements of the system that comprise a global communications network such as the internet, further comprising internet service providers such as internet service provider 10 and proprietary third party data transmissions services such as computer 6. Block 130 illustrates the elements of the system that are typically located in a second remote location, although such elements may also be located in a repair shop. Block 140 shows the elements of the system that are typically located in a remote data center.

Block 100 illustrates a typical repair shop. A system user such as shop technician 1 may access the system of the present invention using a non-proprietary computer such as a personal computer device 2 located in a repair bay or other location in a repair shop. Personal computing device can be a personal computer such as a laptop or desktop computer, a tablet, smartphone, or any other computing device that can be programmed and operated in a manner similar to a conventional personal computer. In order to use the system of the present invention, the user 1 would connect a data cable 3' to a port on a vehicle 3 being diagnosed in the repair shop by the user 1 using computer 2. The industry standard interface for a port on a vehicle 3 may be a J2534-compliant interface, but could be any interface and communications protocol. In one embodiment of the present invention, the user 1 can direct the computer 2 to communicate with a computer 5 located in service center 11 via the internet using a communications link such as links 17 and 18 that connect through an internet service provider 6. Computer 5 may be suitably enabled to store and manage a database of proprietary and public information. User 1 may obtain access to such proprietary and public information under a subscription arrangement with the service center of block 110. The subscription arrangement may be for an annual basis with renewal rights, a more limited time basis, or for a task-specific period of time such as the diagnosis of a single vehicle. Computer 5 contains subscription information that is used to determine which information may be accessed by user 1. In one embodiment of the present invention, a user 1 can subscribe to a subset of software and data related to a given set of vehicles that can be chosen by vehicle model or vehicle manufacturer or both, as well as expert advice that can be provided by one or more experts 7. Computer 5 is suitably enabled to manage an existing subscription, to add access to data and software for additional models and/or manufacturers of vehicles desired by user 1, to enable user 1 to directly contact one or more experts 7, and to bill user 1 for such data and/or software and/or access to experts 7. In one embodiment of the present invention, Computers 5 and/or 5' may store proprietary information related to specific vehicle models. In another embodiment, Computers 5 and/or 5' do not store or manage any proprietary and public information located within block 110, but do store the location of such information stored on computers outside of block 110, and control the access to such information thereby allowing computer 2 to find and access such information. As one example of the service provided by the service center of block 110, a user 1 has determined that vehicle 3 exhibits an anomaly but is unable to resolve the anomaly based on his expertise. The computer 2 downloads certain information about the anomaly from vehicle 3, which then requests information from computer 5 located in block 110. Computer 5 confirms that user 1 has a valid subscription to access information related to the make and model of vehicle 3, and if so, sends suggested diagnostic information to computer 2, thereby allowing user 1 to effect appropriate repairs to vehicle 3.

Block 110 illustrates a service center for managing the system of the present invention. The service center hosts one or more computers 5 or 5' that store a database of information about users such as user 1, specific data and software licensed from a variety of vehicle manufacturers, and other proprietary information related to a knowledge base of vehicle anomalies and proposed solutions to such anomalies. The user database comprises information related to each given user's permissions to access which data, software, experts 7, and the like, as well as billing information. A user 1 can access the computers 5 or 5' to update user information profiles, change subscription permissions, and the like. Service center personnel 4 are available to assist users via telephone and email. Users can communicate with service center 110 through an internet connection provided by an internet service provider 10.

Block 120 illustrates a communications system that utilizes the internet for connectivity. Computer 6 is suitably enabled to dynamically establish links between computer 2 and computers 8 and/or 11, as appropriate, under the control of computer 5 based on a user's subscription permissions. Computer 5 is suitably enabled to communicate with computer 6 through an internet connection. Computer 6 is suitably enabled to communicate with computer 8 through communication link 23. In many instances communications may take place through unsecured connections using an internet service provider 10. However, in other instances it is important that a secure communications channel be established using computer 6 without the need to manually change network settings and the like.

Block 140 illustrates a computer that is suitably enabled to communicate with computer 8 via communication link 22, and a database of proprietary software tools and other information stored on or attached to computer Such proprietary information may consist of software tools that an individual repair shop could license directly from a vehicle manufacturer, but typically would not due to the generally high cost of such licenses.

Block 130 illustrates a computer 8 that is suitably enabled to communicate with computer 6 via communication link 23, computer 11 via communication link 22, and/or computer 2 through computer 6 and via communication link 21. An expert diagnostician 7 is an individual that possesses a high level of expertise with regard to a given vehicle manufacturer's products. Since diagnostician 7 often specializes in only one or a few vehicle types, it is economically viable for diagnostician 7 to license specialized diagnostic software tools and other proprietary information from the manufacturer, such as the software tools and proprietary information stored on computer 11. Technician 1, unwilling or unable to license such diagnostic software tools and other proprietary information directly from the manufacturer, would seek assistance from expert diagnostician 7 in order to properly diagnose anomalies while working on vehicle 3. Technician 1 may contact diagnostician 7 using the secure peer-to-peer links 21 and 23 via computer 6. This more direct peer-to-peer link allows faster diagnostics and circumvents the use of an un-secure internet connection, thereby leaving the un-secured internet connection available to computer 2 for other general communications needs during a given diagnosis session. Further, technician 1 may ascertain that access to a given manufacturer's software tools is required in order to properly diagnose an anomaly or update computer code store in vehicle 3. Diagnostician 7 may connect to the service center of block 110 to ensure that the repair shop of block 100 has a valid subscription to seek such a consultation and/or access proprietary information 10. Upon confirmation of an appropriate subscription, diagnostician 7 can provide the requested consultation or access to proprietary information 10. In this manner, the expertise of diagnostician 7, located remotely from technician 1, may be economically shared with many technicians regardless of their physical location so long as there is a means for electronic or telephonic communication. In addition, diagnostician 7 may allow technician 1 to access proprietary information and software tools that technician 1 would not otherwise be able to afford to access independently. The result is that a technician 1 can provide a level of service to the owner of vehicle 3 that would otherwise be unavailable at relatively low cost, or in some instances simply unavailable regardless of cost.

In one embodiment of the present invention, technician 1 contacts expert diagnostician 7 for expert advice regarding difficulties in fixing a vehicle manufactured by a given manufacturer with which diagnostician 7 has extensive expertise in diagnosis and repair. Diagnostician 7 directs user 1 to contact the service center of block 110 to obtain a subscription for the service of the present invention, to download certain required software to computer 2, and to complete a setup process. Upon completion of the setup process, the user 1 can execute the downloaded software on computer 2 which immediately provides presence information to the expert diagnostician 7. This presence information contains information about the repair shop of block 100 and displays the specific J2534-compliant diagnostic device that user 1 has connected to vehicle 3. After establishing a communications link using an internet connection to the service center of block 110, diagnostician 7 can send diagnostic codes or software to vehicle 3. The communication link may consist of a service-bus initiated peer-to-peer connection through computer 6 and communication links 21 and 23, for improved performance and security. As viewed from computer 8 accessed by expert diagnostician 7, it appears that the J2534-compliant pass-thru device that vehicle 3 is communicating with is directly connected to computer 8. Via several transitions, the transmitted data and/or software is kept true to its original form and the J2534 specification is preserved, albeit with a slight time delay introduced due to the nature of the internet.

What is claimed is:

1. A method for remotely reprogramming an automobile onboard computer involving
   (i) an automobile disposed at a repair shop, the automobile including the automobile onboard computer,
   (ii) a first computing device disposed at the repair shop,
   (iii) a J2534-compliant reprogramming tool that is
      (A) connected via a first cable terminating in an OBD-II connector to the automobile onboard computer, and
      (B) connected via a second cable terminating in a USB connector to the first computing device, and
   (iv) a second computing device disposed at a location remote from the repair shop, the second computing device including diagnostic software loaded thereon providing functionality to reprogram a vehicle onboard computer via a USB cable connection to a J2534-compliant pass-thru device which is itself connected to a vehicle onboard computer;
   the method comprising:
   (a) receiving, at the second computing device from an automobile diagnostic technician via one or more input devices associated with the second computing device, input corresponding to interaction with a user interface of the diagnostic software, and
   (b) remotely reprogramming, by the diagnostic software based on the received input, the automobile onboard computer by communicating data back and forth between the diagnostic software and the vehicle onboard computer, the remote reprogramming comprising
      (I) mimicking, at the second computing device, a USB cable connection to the J2534-compliant reprogramming tool by
         (A) communicating, by link software loaded on the first computing device to link software loaded on the second computing device, data received at a USB port of the first computing device from the J2534-compliant reprograming tool over the second cable,
         (B) communicating, by the link software loaded on the second computing device to the diagnostic software, data received from the link software loaded on the first computing device,
         (C) communicating, by the link software loaded on the second computing device to the link software loaded on the first computing device, data received from the diagnostic software,
         (D) communicating, by the link software loaded on the first device to the J2534-compliant reprogramming tool via the USB port over the second cable, data received from the link software loaded on the second computing device,
      (II) wherein such mimicking allows the diagnostic software to function as if it was directly connected via a USB cable to the J2534-compliant reprogramming tool even though it is not.

2. The method of claim 1, wherein the first computing device is a laptop.

3. A method for remotely reprogramming an automobile onboard computer involving
   (i) an automobile disposed at a repair shop, the automobile including the automobile onboard computer,
   (ii) a first computing device disposed at the repair shop,
   (iii) a reprogramming tool that is
      (A) connected via a first cable to the automobile onboard computer, and
      (B) connected via a second cable to the first computing device, and
   (iv) a second computing device disposed at a location remote from the repair shop, the second computing device including diagnostic software loaded thereon providing functionality to reprogram a vehicle onboard computer via a cable connection to a pass-thru device which is itself connected to a vehicle onboard computer;
   the method comprising:
   (a) receiving, at the second computing device from an automobile diagnostic technician via one or more input devices associated with the second computing device, input corresponding to interaction with a user interface of the diagnostic software, and
   (b) remotely reprogramming, by the diagnostic software based on the received input, the automobile onboard computer by communicating data back and forth between the diagnostic software and the automobile onboard computer, the remote reprogramming comprising
      (I) mimicking, at the second computing device, a cable connection to the reprogramming tool by
         (A) communicating, by link software loaded on the first computing device to link software loaded on the second computing device, data received at a port of the first computing device from the reprograming tool over the second cable,
         (B) communicating, by the link software loaded on the second computing device to the diagnostic software, data received from the link software loaded on the first computing device,
         (C) communicating, by the link software loaded on the second computing device to the link software loaded on the first computing device, data received from the diagnostic software, (D) communicating, by the link software loaded on the first device to the reprogramming tool via the port over the second cable, data received from the link software loaded on the second computing device, (II) wherein such mimicking allows the diagnostic software to function as if it was directly connected via a cable to the reprogramming tool even though it is not.

4. A method for remotely reprogramming an automobile onboard computer involving
 (i) an automobile disposed at a repair shop, the automobile including the automobile onboard computer,
 (ii) a first electronic device disposed at the repair shop that is connected via a first USB cable to the automobile onboard computer, and
 (iii) a second electronic device disposed at a location remote from the repair shop, the second electronic device including diagnostic software loaded thereon providing functionality to reprogram a vehicle onboard computer via a USB cable connection;

the method comprising:
 (a) mimicking, at the second electronic device, a USB cable connection to the automobile onboard computer such that it appears to the diagnostic software that the second electronic device is connected via a USB cable to the automobile onboard computer so as to allow the diagnostic software to function as if it was connected via a USB cable to the automobile onboard computer,
 (b) receiving, at the second electronic device from an automobile diagnostic technician via one or more input devices associated with the second electronic device, input corresponding to interaction with a user interface of the diagnostic software, and
 (c) remotely reprogramming, by the diagnostic software based on the received input, the automobile onboard computer by communicating data back and forth between the diagnostic software and the automobile onboard computer over
  (1) a communications link established between the first and second electronic devices, and
  (2) the first USB cable.

* * * * *